April 7, 1970 W. D. HOUGH 3,505,674
DIGITAL ENCODING DEVICE
Filed June 27, 1966 2 Sheets-Sheet 1
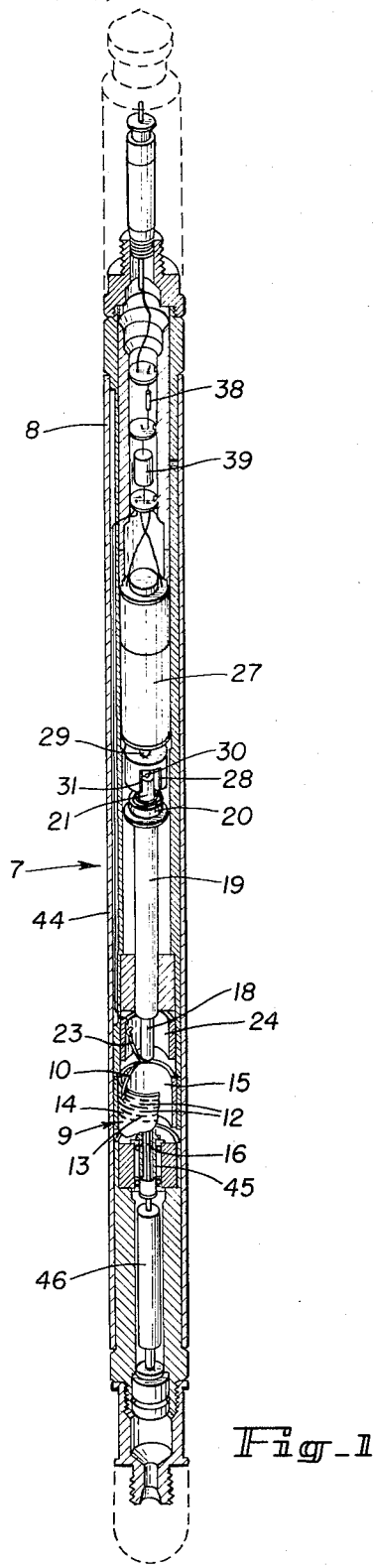
Fig_1
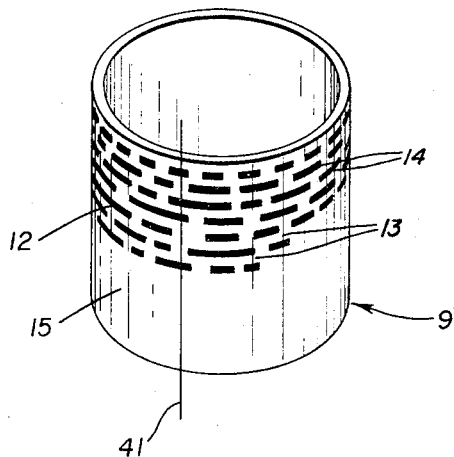
Fig_2
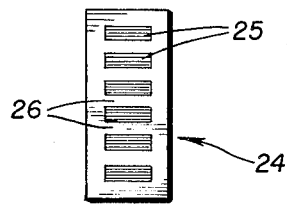
Fig_3
INVENTOR.
WILLIAM D. HOUGH
BY Campbell and Simis
ATTORNEYS April 7, 1970        W. D. HOUGH        3,505,674

DIGITAL ENCODING DEVICE

Filed June 27, 1966        2 Sheets-Sheet 2

INVENTOR.
WILLIAM D. HOUGH
BY Campbell and Harris

ATTORNEYS

United States Patent Office 3,505,674
Patented Apr. 7, 1970

3,505,674
DIGITAL ENCODING DEVICE
William D. Hough, Arvada, Colo., assignor, by mesne assignments, to Lynes, Inc., a corporation of Texas
Filed June 27, 1966, Ser. No. 560,480
Int. Cl. G08c 5/00
U.S. Cl. 340—347                    14 Claims

ABSTRACT OF THE DISCLOSURE

A housing adapted to be lowered into an oil or gas well drilled into the earth includes therein a condition sensor for measuring the subsurface pressure or temperature or the like. Such condition sensor causes rotational movement of a code drum having a coded pattern of conductive and nonconductive segments on the outer surface thereof. This coded pattern is periodically scanned in an axial direction by a contact brush. An electrical circuit connected to the code drum and the contact brush develops a train of electrical output pulses corresponding to the sequence of conductive and nonconductive segments contacted by the brush during each axial scan. The segment pattern is constructed so that the pulse train for each scan is digitally coded to represent a number indicative of the magnitude of the subsurface condition sensed by the condition sensor. These digitally coded pulses are transmitted by way of an electrical conductor to a recorder located at the surface of the earth.

---

This invention relates to a compact digital encoding device and more particularly relates to an encoding device that is particularly well suited for use in sensing conditions at a relatively inaccessible location and generating a pulse train indicative thereof.

It is oftentimes desirable, and in many cases necessary, to obtain information at remote locations that have heretofore been considered to be inaccessible. Such is the case, for example, where it is desirable, or necessary, to obtain information concerning a condition, such as pressure, temperature, or the like, downhole in an oil well having a base the diameter of which is too small to receive existing equipment of this type.

In addition, some prior equipment, particularly equipment not utilizing a digital encoding system, has also proved to be unsatisfactory in either producing an output that can be utilized to accurately reflect the condition measured or in producing an output that can be transmitted to utilization of equipment without adversely effecting the sense of the information.

It is therefore an object of this invention to provide a compact digital encoding device that is not only well suited for use in sensing conditions at locations heretofore considered to be inaccessible, but is also capable of generating an output which can be transmitted from the device and still accurately reflect the condition sensed.

It is a feature of this invention to achieve compactness without sacrificing quality, and this end is gained through the use of a compact code drum and brush arrangement as well as a drive acting substantially parallel to the central axis of the drum through use of a helical cam.

It is therefore another object of this invention to provide a digital encoding device that utilizes a code drum having selectable portions thereon engaged by a brush during relative movement therebetween to provide a pulse train indicative of a sensed condition.

It is yet another object of this invention to provide a digital encoding device that includes an actuator that is driven in a direction substantially parallel to the central axis of the drum by a cam having a spiral surface to cause a condition indicating pulse train to be generated.

It is still another object of this invention to provide a digital encoding device of compact size for use at a remote location that includes a drum having spaced coding hands thereon, a longitudinally movable actuating shaft for moving a brush across the periphery of the drum, and a helical cam for effecting longitudinal movement of the actuating shaft.

With these and other objects in view which will become apparent to one skilled in the art as the description proceeds, this invention resides in the novel construction, combination and arrangement of parts substantially as hereinafter described and more particularly defined by the appended claims, it being understood that such changes in the precise embodiment of the herein-disclosed invention are meant to be included as come within the scope of the claims.

The accompanying drawings illustrate a complete example of the embodiment of the invention constructed according to the best mode so far devised for the practical application of the principles thereof, and in which:

FIGURE 1 is a perspective view partly in section of the compact digital encoding device of this invention shown in conjunction with oil well pressure measuring apparatus;

FIGURE 2 is a perspective view of the drum shown in FIGURE 1;

FIGURE 3 is a top view of the interrupter switch shown in FIGURE 1;

Figure 4:
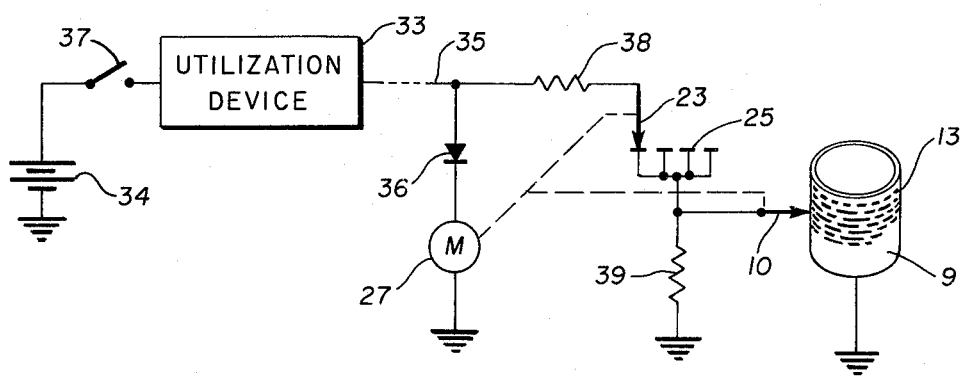
FIGURE 4 is a schematic diagram of the electrical circuit for generating the digital output signal.

Referring now to the drawings, in which like numerals have been used for like characters throughout, the numeral 7 refers to the digital encoding device which, as shown in FIGURE 1, may be included in an oil well pressure indicating apparatus 8.

Digital encoding device 7 utilizes a code drum 9 and a brush, or finger, 10 as coding members. As shown in FIGURES 1 and 2, code drum 9 has a plurality of spaced coding bands 12 each of which consist of a pattern of conductive segments 13 and nonconductive segments 14. Bands 12 preferably extend entirely around the periphery 15 of the drum, but may extend only partially around the drum in those situations where the drum can be rotated less than a full revolution. As shown in FIGURE 1, brush 10 is sequentially brought into contact with a selected portion of each band each time the brush is caused to be moved parallel to the central axis 16 of the drum with the brush in contact with the periphery of the drum.

Brush 10 is attached to one end 17 of an actuating shaft 18, which shaft is conveniently mounted in a sleeve 19 so that the shaft is movable longitudinally. In addition, the shaft is constrained against rotation in conventional manner (not shown) and is biased in the direction away from the drum, as by means of spring 20 positioned near end 21 of shaft 18.

A second brush, or finger, 23 is provided at end 17 of shaft 18 and this brush engages a plate 24 having a pattern of conductive segments 25 and nonconductive segments 26 thereon, as shown in FIGURE 3. Brush 23 is constrained to movement in conjunction with brush 10 and together with the pattern on plate 24 forms an interrupter switch. The conductive and nonconductive segments are spaced on plate 24 so that brush 23 engages a conductive segment 25 when brush 10 engages each coding band 12 on code drum 9.

Actuator 18 is driven by electric motor 27 through a camming arrangement which includes a cam 28 with a spiral surface, and preferably a helical surface, attached to the rotatable shaft 29 of motor 27 and a cam follower 30 attached to the end 21 of actuating shaft 18. As can be seen in FIGURE 1, spiral surfaced cam 28 causes the shaft to be moved longitudinally through sleeve 19 when the motor is energized to thus rotate the motor shaft 29.

Since the shaft need only be driven slowly in one direction to cause brush 10 to be swept across the coding bands on drum 9 in order to establish the output pulse train, an abrupt return is effected by providing a surface 31 parallel to the longitudinal axis of the shaft and extends from the top of the spiral surface of the cam to the bottom. Thus, when the cam follower reaches the top of the spiral, it snaps back to the bottom because of the spring bias of spring 20, and this quickly returns brush 10 (as well as brush 23) to the point of origination (the edge of the drum nearest the actuator as shown in FIGURE 1).

As shown in FIGURE 4, the output pulse train is generated by an electrical circuit which includes the conductive segments 13 of the coding bands 12 on the code drum 9, conductive segments 25 of plate 24, and brushes 10 and 23. As indicated in FIGURE 4, the utilization device 33, such as a recorder and/or indicator, that is remotely situated and preferably includes an ammeter (not shown) which may be read out directly or conventionally transferred to a graph such as is shown, by way of example, in FIGURE 5.

Electrical power is supplied remotely from the encoder, as by battery 34, as indicated in FIGURE 4, through the utilization device 33 and a single conductor 35 (it being understood that ground provides a return path). The supplied power is coupled through a protective diode 36 to motor 27 to energize the motor and cause a pulse train to be produced. A switch 37, located remotely from the encoder, is provided to control energization of motor 27.

Referring again to FIGURE 4, brush 23 is connected through resistor 38 to conductor 35 (leading from the power supply) while the conductive segments 25 of plate 24 are connected to ground through resistor 39, which resistor is connected in parallel with brush 10 and conductive segments 13.

Thus, since brushes 10 and 23 are displaced by motor 27, if the interrupter switch (brush 23 and plate 25) is open, only the resistance of the motor ($R_m$) is in the current path. In this condition, the ammeter reading would indicate a minimum since with constant voltage, current would be a minimum when resistance is maximum according to the formula:

$$I = V/R \tag{1}$$

This condition will occur before the pulse train is generated and during that time that brush 10 moves from one coding band 12 to the next coding band.

When the interrupter switch is closed, as will be the condition during the period when brush 10 is engaged with each one of the coding bands 12 of the code drum, the resistance of the motor ($R_m$) will be in parallel electrically with either resistor 38 or resistors 38 and 39 connected in series with one another. Only resistor 38 will be in the circuit if brush 10 is engaged with a conductive segment 13 of one of the coding bands 12 (since resistor 39 is then by-passed), and both resistors 38 and 39 will be in the circuit if brush 10 is engaged with one of the nonconductive segments 14 of one of the coding bands 12.

When brush 10 is on a conductive segment 13, the total resistance (ignoring the resistance of the leads) will be equal to:

$$\frac{R_m \times R_{38}}{R_m + R_{38}} \tag{2}$$

When brush 10 is on a nonconductive segment, the total resistance (ignoring the resistance of the leads) will be equal to:

$$\frac{R_m \times (R_{38} + R_{39})}{R_m + R_{38} + R_{39}} \tag{3}$$

From the foregoing, it can be readily seen that since current will be at a maximum when resistance is at a minimum, current will be maximum when brush 10 is on a conductive segment 13 (so that $R_m$ and $R_{38}$ are in parallel in circuit), and at a value between maximum and minimum when brush 10 is on a nonconductive segment 14 (so that $R_m$, $R_{38}$ and $R_{39}$ are in circuit). This is due, of course, to the fact that:

$$R_m > \frac{R_m \times (R_{38} + R_{39})}{R_m + R_{38} + R_{39}} > \frac{R_m \times R_{38}}{R_m + R_{38}} \tag{4}$$

Figure 5:
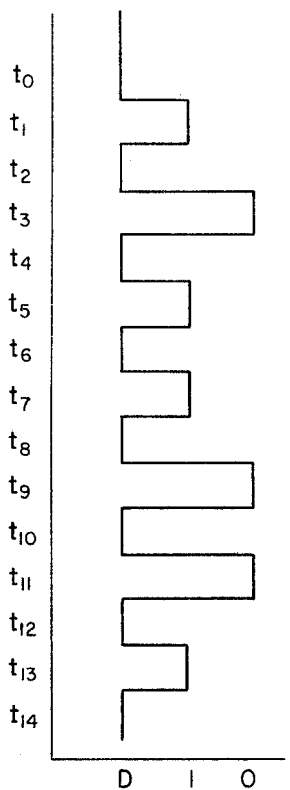
FIGURE 5 is a graph showing a typical readout of a pulse train generated by the digital encoding device of this invention.

Referring to FIGURE 5, the graph illustrates a typical pulse train output when brush 10 sweeps the coding bands along line 41 as shown in FIGURE 2. At time $t_0$, only the motor resistance will be in the circuit since the interrupter switch will be open (the sweep has not as yet begun). Current is at a minimum at this time, as shown in FIGURE 5, and can be termed the dwell position or indication.

At time $t_1$, brush 10 is in contact with the first coding band 12 on drum 9 and the interrupter switch is closed. Since brush 10 engages a nonconductive segment 14 when following the path of line 41 (FIGURE 2), the resistance would be reflected by Equation 3 hereinabove and hence current would be at midpoint, as shown in FIGURE 5.

At time $t_2$, the interrupter switch is again open (to allow for displacement of brush 10 to the next coding ring on drum 9) and hence current is again at a minimum as shown in FIGURE 5.

At time $t_3$, the interrupter switch is again closed, and since brush 10 is now on a conductive segment 13 of the second coding ring (following line 41 of FIGURE 2), the resistance is reflected by Equation 2 and hence current is at a maximum to produce a high amplitude pulse, as shown in FIGURE 5.

Considering the pulse of lesser amplitude (i.e., the pulse produced at time $t_1$) to indicate a "1" and the pulse of greater amplitude (i.e., the pulse produced at time $t_3$) to indicate a "0", the coded output signal produced when brush 10 sweeps entirely across the seven coding bands shown in FIGURE 2 would be 1011001.

It is to be appreciated that the foregoing is by way of illustration only and that the number of coding bands, as well as the code utilized, may be as varied as desired without departing from the intended scope of this invention.

When utilizing the digital encoding device of this invention in conjunction with an oil well condition measuring apparatus, as shown in FIGURE 1, the encoding device is included within housing 44 with code drum 9 being conventionally mounted for rotation on a control shaft 45 which is rotatably positioned by a condition sensing device, such as, for example, a Bourdon tube 46, which, as is well known in the art, translates pressure changes into shaft rotation.

Thus, as shown in FIGURE 1, the pressure sensed by the Bourdon tube is used to position shaft 45 and this controls the rotation of drum 9. This, of course, presents specific portions of each coding band on the code drum for engagement by brush 10 and the produced pulse train therefore reflects the sensed condition.

Obviously, the conductive and nonconductive segments on each coding band 12 are chosen so that the produced pulse train varies for each predetermined increment of rotation (the amount of rotation causing a change of code depends upon selectivity desired and physical limitations such as spacing between segments). The coded output can then, of course, be quickly converted at the surface to a pressure reading indicative of the condition sensed.

It is to be appreciated that while the encoding device has been shown in conjunction with a pressure gauge, other condition sensors could be utilized, such as, for example, temperature or liquid level sensors. It is also to be appreciated that the embodiment shown herein could be modified, such as, for example, by connecting the condition sensors to the brush to select the path of drum engagement of connecting the actuator to the drum to cause relative movement between the drum and brush, all without departing from the intended scope of this invention.

When utilizing the encoding device in a compact unit downhole in an oil well, it has been found that an arrangement of parts as shown in FIGURE 1 is advantageous. As shown in FIGURE 1, the code drum 9 is positioned just above Bourdon tube 46, plate 24 is positioned on the housing wall above the drum, and actuator shaft 18, cam 28 and motor 27 are positioned in that order above the drum.

Resistors 38 and 39 are positioned above the motor and the single conductor 35 is connected to the electrical circuitry of the encoder through the top of the unit in conventional fashion.

This invention thus provides a heretofore unavailable compact digital encoding device that is especially well suited to provide a digital output signal at heretofore inaccessible remote locations.

What is claimed is:

1. A digital encoding device, comprising: first and second coding members, said first member having selectable portions cooperable with said second member during relative movement between said members in a predetermined direction; input means operatively connected with one of said members for selecting one of said selectable portions; an actuator operatively connected with one of said members for causing relative movement between said members in said predetermined direction; a prime mover; camming means including a cam, at least portions of the surface of which is a spiral, and a cam follower, one of which is operatively connected to said actuator and the other of which is operatively connected to said prime mover for driving said actuator; and circuit means acting in conjunction with said coding members and in response to relative movement between said coding members in said predetermined direction for generating a digital output signal identifying the selected selectable portion.

2. The device of claim 1 wherein said actuator is a shaft moved in a longitudinal direction by said prime mover acting through said camming means.

3. The device of claim 1 wherein said actuator is connected to said second coding member and to said cam follower, and said prime mover is connected to said cam.

4. A digital encoding device, comprising: condition sensing means for sensing the magnitude of a physical parameter and having a movable member the position of which is indicative of such magnitude; first and second coding members, one of which is a drum having selectable portions cooperable with the other said member during relative movement between said members in a predetermined direction, and one of said members being responsive to movement of the movable member of said condition sensing means for selecting one of said selectable portions; an actuator operatively connected with one of said members for causing relative movement between said members in said predetermined direction; a prime mover; camming means including a cam and a cam follower, one of which is operatively connected to said actuator and the other of which is operatively connected to said prime mover for driving said actuator; and circuit means acting in conjunction with said coding members for generating in response to relative movement between said coding members in said predetermined direction a digital output signal indicative of the magnitude of the physical parameter being sensed.

5. The device of claim 4 wherein said cam is a helical cam operatively connected to said prime mover and wherein said cam follower is operatively connected to said actuator.

6. The device of claim 4 wherein said drum has a plurality of spaced coding bands extending at least partially around the periphery of said drum with each of said bands having a predetermined pattern of conductive and nonconductive segments.

7. The device of claim 6 wherein said other coding member is a brush which sequentially engages a selected portion of each of said bands when said actuator causes relative movement between said coding members in said predetermined direction.

8. The device of claim 7 wherein said drum is rotated by said condition sensing means to select a portion of each band to be engaged by said brush, and wherein said actuator and brush are moved in a path substantially parallel to the central axis of said drum so that said brush sequentially contacts the selected portion of each band on said drum to thereby enable generation of said digital output signal.

9. A digital encoding device, comprising condition sensing means for sensing the magnitude of a physical parameter and having a movable member the position of which is indicative of such magnitude; first and second coding members, one of which has selectable portions cooperable with the other said member during relative movement between said members in a predetermined direction, and one of said members being responsive to movement of the movable member of said condition sensing means for selecting one of said selectable portions; an actuator operatively connected with one of said members for causing relative movement between said members in said predetermined direction; a prime mover; camming means including a helical cam and a cam follower, one of which is operatively connected to said actuator and the other of which is operatively connected to said prime mover for driving said actuator; and circuit means acting in conjunction with said coding means and including interrupter switching means for generating in response to relative movement between said coding members in said predetermined direction a digital output signal indicative of the magnitude of the physical parameter being sensed.

10. The device of claim 9 wherein said interrupter switching means is closed only when said selectable portions of said one member cooperate with said other member to enable generation of said pulse train.

11. A digital encoding device, comprising: condition sensing means for sensing the magnitude of a physical parameter and having a rotatable member the rotational position of which is indicative of such magnitude; a drum having a plurality of spaced coding bands extending at least partially around the periphery thereof with each of said bands having a predetermined pattern of conductive and nonconductive segments, the rotational position of said drum being controlled by the rotatable member of said condition sensing means; a brush engageable with the periphery of said drum; an actuating shaft operatively connected with said brush whereby when said actuator is moved in a longitudinal direction said brush is caused to sequentially engage a preselected portion of each of said bands; an electric motor; a cam connected to said electric motor; a cam follower connected to said actuator for causing said actuator to be moved longitudinally when said motor is energized; and circuit means including said brush and the conductive segments of said bands on said drum for generating in response to movement of said brush across said coding bands a digital output signal indicative of the magnitude of the physical parameter being sensed.

12. A digital encoding device for use downhole in a borehole, drilled into the earth, said device comprising: condition sensing means for sensing the magnitude of a physical condition in the hole and having a rotatable member the rotational position of which is indicative of such magnitude; a code drum of predetermined small diameter having a plurality of spaced coding bands extending at least partially around the periphery thereof with each of said bands having a predetermined pattern of conductive and nonconductive segments, the rotational position of said drum being controlled by the rotatable member of said condition sensing means; an actuating shaft positioned substantially parallel to the central axis of said code drum; a brush connected to one end of said shaft adjacent said drum, said brush being engageable with the periphery of said drum; a motor positioned adjacent the other end of said actuating shaft; camming means including a cam and a cam follower, one of which is connected to said motor and the other of which is connected to the other end of said actuating shaft whereby energization of said motor causes said actuating shaft to be moved in a longitudinal direction; and circuit means for energizing said motor and including said brush and the conductive segments of each said coding bands on said drum for generating a digital output signal indicative of the portion of each band sequentially engaged by said brush when moved across the periphery of said drum and thus indicative of the magnitude of the physical condition being sensed.

13. The device of claim 12 wherein said condition sensing means is positioned adjacent said drum at the end thereof opposite that adjacent said actuating shaft.

14. A digital encoding device comprising:

coding means including a drum member having a coded pattern of conductive and nonconductive segments on a curved surface portion thereof and a brush member adapted for passage across such segments;

condition sensing means for sensing the magnitude of a physical parameter and having a movable member coupled to one of the drum and brush members for causing relative movement in a first direction therebetween in accordance with the magnitude of such physical parameter;

actuating means for causing relative movement in a second direction between the drum and brush members, such second direction not being parallel to the first direction;

interrupter switch means having a movable switch member for making and breaking an electrical circuit, such movable switch member being mechanically coupled to the actuating means for movement in synchronism therewith;

and circuit means electrically coupled in circuit with the coding means and the interrupter switch means and operative during operation of the actuating means for generating a digital output signal indicative of the magnitude of the physical parameter being sensed.

References Cited
UNITED STATES PATENTS

| | | | |
|---|---|---|---|
| 740,816 | 10/1903 | Daily | 74—567 |
| 1,708,164 | 4/1929 | Widell | 74—567 |
| 2,501,542 | 3/1950 | Sheldon | 74—56 |
| 3,012,243 | 12/1961 | Nelli et al. | 340—345 |
| 3,207,845 | 9/1965 | Swenson | 235—61.115 |
| 3,255,338 | 6/1966 | Robenson et al. | 340—347 |
| 3,292,604 | 12/1966 | Riffe | 74—567 |
| 3,373,266 | 3/1968 | Engel et al. | 235—42 |
| 3,231,670 | 1/1966 | Lane et al. | 340—204 |
| 3,007,134 | 10/1961 | Kolb | 340—203 |

MAYNARD R. WILBUR, Primary Examiner

J. GLASSMAN, Assistant Examiner

U.S. Cl. X.R.

235—15.5; 324—1